Aug. 29, 1933.  A. REEKERS  1,924,165
FASTENER
Filed March 18, 1932
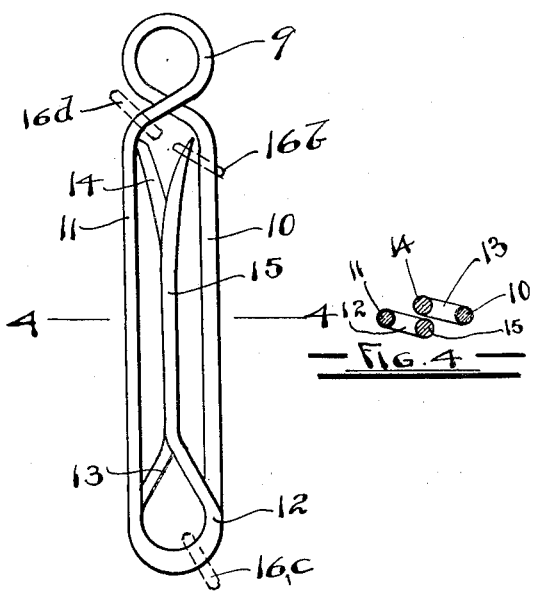
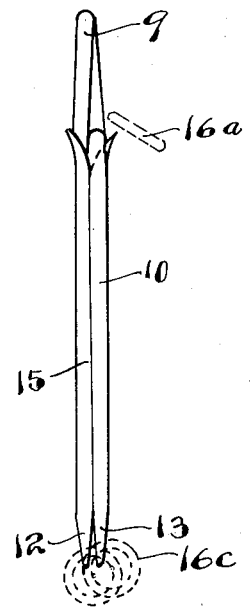
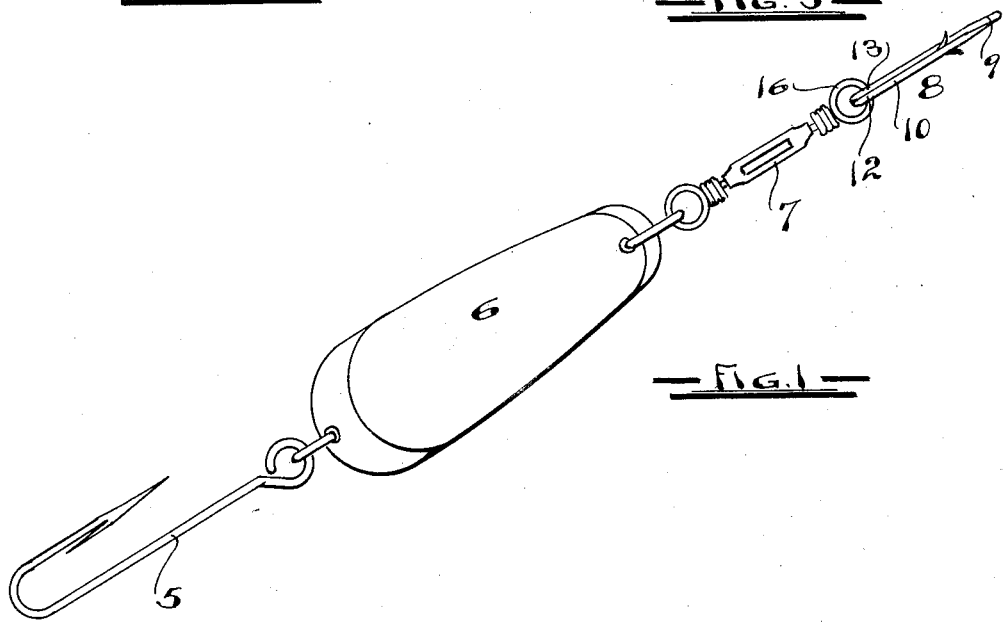
INVENTOR
ANDREW REEKERS
BY C. F. Blake
ATTORNEY Patented Aug. 29, 1933

1,924,165

UNITED STATES PATENT OFFICE 1,924,165

FASTENER

Andrew Reekers, Portland, Oreg.

Application March 18, 1932. Serial No. 599,714

1 Claim. (Cl. 24—237)

My invention relates to fasteners in general, and particularly to such fasteners as are used to secure a fish line to a fish lure such as a trolling spoon or the like, the object of my invention being to provide a fastener by the use of which a fish lure may be easily secured to or removed from a fish line without the tying or untying of knots. I accomplish this object by means of the construction illustrated in the accompanying drawing, which is a part of this application for Letters Patent, like characters of reference indicating like parts throughout the several figures thereof, and in which:

Fig. 1 is view of a fish lure and a fish line secured thereto by my device.

Fig. 2 is an enlarged side elevation of my device.

Fig. 3 is an edge view of the same.

Fig. 4 is a section upon line 4—4 of Fig. 2.

In general my invention consists of a series of parallel bars terminating at each end thereof in loops, said bars being so disposed relatively one to another that a ring may be passed over one of said bars, thence over another of said bars, thence over two of said bars, and thence into an adjacent pair of said loops, and by the reverse of said manipulation the ring may be removed from the device.

In the drawing 5 represents a fish hook secured to a spoon 6 to which is attached a swivel 7. My device 8 is intermediate the swivel and the fish-line, to each of which it is attached.

The device is most conveniently constructed of wire, and is so illustrated in the drawing. A loop 9 is formed by bending the wire back upon itself in the usual manner of forming wire loops.

The two ends of said wire thus form parallel bars 10 and 11.

At the extremities of said bars each is bent back upon itself to form another loop, said latter loops being indicated by 12 and 13. This results in two additional parallel bars 14 and 15 adjacent each other, parallel also to said former mentioned bars, and centrally positioned relative thereto, as shown in Fig. 2.

The extremities of said bars 14 and 15 are bent in a curve outward from the device to facilitate the placing of a ring thereover.

To add strength to the loops 12 and 13 I flatten them in a direction sidewise to the device, as shown in Figs. 2 and 3, making the lower portions thereof thinner and deeper than the diameter of the wire of which the device is constructed.

In use the fish line is tied into the loop 9 of my device, and the ring 16 of the fish lure is then entered into the twin loops 12 and 13, and the fish lure is ready for use. To accomplish this the ring 16 is placed adjacent one of the curved ends of the bars 14 or 15, as shown in dotted lines at 16a in Fig. 3. Said ring is then slipped down over the curved end of the adjacent bar as shown at 16b in Fig. 2. It is then pushed along said bar until it enters the loop at the opposite end of the device from which it was entered, and takes a position in one of the loops 12 or 13, as shown at 16c in Fig. 2. Said ring 16 is then pushed along the other bar communicating with the twin loop, as illustrated this is bar 11, until the ring is in the position indicated by 16d in Fig. 2. The ring is then slipped over the curved end of the adjacent centrally positioned bars, illustrated as bar 14, thus embracing both the bar 11 and the bar 14. From this position it is slipped along said embraced bars into both of the twin loops 12 and 13. The device is then in the position intermediate the fish line and the fish lure as shown in Fig. 1.

By the convenience and rapidity with which the above described method of use may be accomplished my device fulfills the object for which it was invented.

Having described and illustrated my invention so that others may be enabled to construct and to use the same, what I claim as new and desire to secure by Letters Patent is:

In a fastener: a loop; two parallel bars integral with said loop; a loop formed upon the extremities of each of said bars; a second pair of parallel bars adjacent each other and parallel to said former bars, one of each of said latter bars being integral with one of said latter loops, said latter bars being centrally positioned between said former bars; and outwardly curved extremities upon each of said latter bars.

ANDREW REEKERS.